United States Patent [19]

Ushiro et al.

[11] Patent Number: 4,799,075
[45] Date of Patent: Jan. 17, 1989

[54] FILM LOADING DATA DISPLAY DEVICE FOR CAMERA

[75] Inventors: Seimei Ushiro, Tokyo; Hiromi Kaneko, Kanagawa, both of Japan

[73] Assignee: Fuji Photo Film Co., Ltd., Kanagawa, Japan

[21] Appl. No.: 894,280

[22] Filed: Aug. 7, 1986

[30] Foreign Application Priority Data

Aug. 7, 1985 [JP] Japan .............................. 60-172403

[51] Int. Cl.⁴ ........................................... G03B 17/18
[52] U.S. Cl. ................................................ 354/289.1
[58] Field of Search .............. 354/21, 465, 471, 474, 354/475, 105, 106, 109, 289.1, 289.12

[56] References Cited

U.S. PATENT DOCUMENTS 3,953,868 4/1976 Kawamura et al. ................ 354/109

FOREIGN PATENT DOCUMENTS 24132 2/1983 Japan .................................. 354/109
88229 6/1983 Japan ................................ 354/289.1

Primary Examiner—W. B. Perkey
Attorney, Agent, or Firm—Young & Thompson

[57] ABSTRACT

A film loading date display device for a camera includes an input unit for inputting a film loading date, a storing unit for storing the inputted film loading date, and a display unit for displaying the stored film loading data. The input unit is comprised either of a date setting switch and a timer circuit, or of DX contacts adapted to contact the outer periphery of a patrone for detecting film information, a switch for detecting the opening of a film loading door, and a timer circuit. Current date information counted by the timer circuit is written as a film loading date in the storing unit upon actuation of the date setting switch or upon loading of the patrone as well as closing of the door.

3 Claims, 2 Drawing Sheets

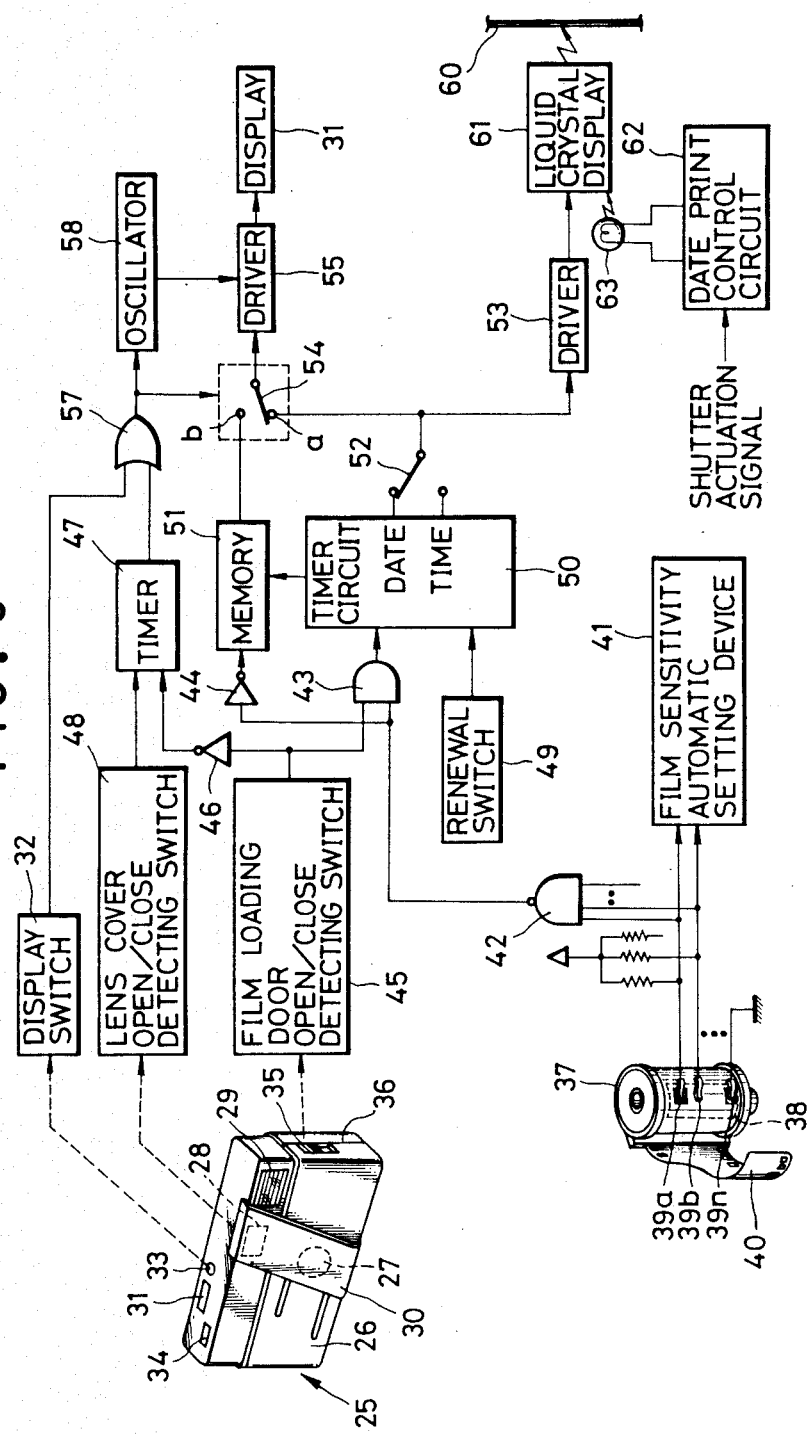

FILM LOADING DATA DISPLAY DEVICE FOR CAMERA

BACKGROUND OF THE INVENTION

The present invention relates to a film loading date display device for a camera.

To save money, many people keep film in their camera until the entire roll is exposed, before having it developed.

For instance, after taking photographs at an event such as a wedding, these people will take photographs at a subsequent event using the remaining frames of the same roll of film.

When the same roll is used for taking photographs at different events, the photographer sometimes forgets if the frames used for an earlier event have been developed or not. This happens particularly in the case of using a film having a greater number of frames, for example, a film of 36 frames. This problem arises especially for a half-frame camera because the half-frame camera can handle twice as many frames as a full-frame camera, e.g., the available number of frames becomes 72 for a film of 36 frames.

Furthermore, if a film is kept for a long time in the camera, the quality of the film may decline. Therefore, in the case of taking photographs of an important event such as a wedding, it becomes necessary to replace the film with a new one if there is a risk that the quality may decrease with time. However, in most cases, an amateur does not remember the film loading date, and does not keep in mind the useful life of the film in the camera. Thus, a change in the quality of photographs that have been taken may occur, or an old film that has deteriorated with time may be used so that poor photographs are produced.

SUMMARY OF THE INVENTION

It is an object of the present invention to provide a film loading date display device for a camera, capable of forecasting a risk of a change in film quality.

To achieve the above object of the present invention, there are provided input means for inputting a film loading date, a memory, and display means, whereby the inputted film loading date is stored in the memory to be displayed on display means if necessary, or at all times.

Inputting the film loading date mey be performed using numerical keys. However, a more convenient input operation can be performed using a timer circuit. That is, the date obtained by the timer circuit at the time when a date setting switch is actuated is stored in the memory, and the film loading date stored in the memory is then displayed on the display. The film loading date can be made to flash on the display for indication of film replacement after a certain period of time, e.g., one year, has passed from the film loading date.

According to the present invention, it is preferable to use a date print camera containing a timer circuit since the timer circuit of the camera can be used as the element constituting the present invention. In this case, it is preferable to detect the closing of the film loading door after loading a patrone or film cartridge in the patrone container of the camera body to automatically store in the memory the date, i.e., year, month and day, using the time counted by the timer circuit. The film loading date stored in the memory can later be displayed, when a display switch is actuated or for a predetermined period after the camera cover is removed, instead of displaying the current time or date counted by the timer circuit. Detection of the patrone loading may be effected by a pin mounted on the patrone container by which a detection switch is actuated when the patrone depresses the pin, or may be effected upon the DX contacts that detect film information.

BRIEF DESCRIPTION OF THE DRAWINGS

The preferred embodiments of the present invention will now be described by way of examples with reference to the accompanying drawings, in which:

FIG. 3 is a block diagram of the film loading date display device for a camera according to another embodiment of the present invention, wherein the setting of the film loading date is automatically performed.

DETAILED DESCRIPTION OF THE INVENTION

Figure 1:
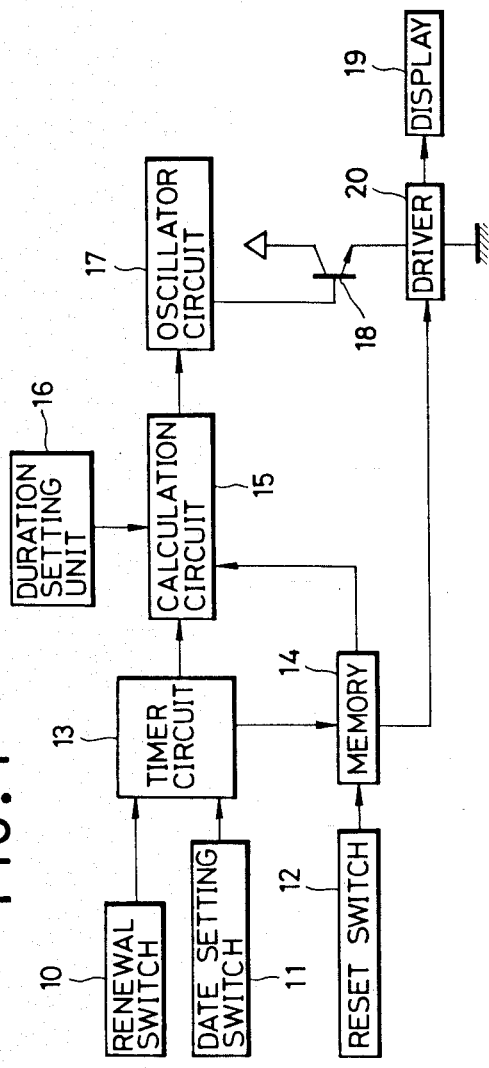
FIG. 1 is a block diagram of the film loading date display device for a camera according to an embodiment of the present invention.

FIG. 1 illustrates a first embodiment of the film loading date display device according to the present invention. The film loading date display device is provided on a camera body (not shown) with a renewal switch 10 for renewal of time or date, a date setting switch 11 to be operated at the time of film loading, and a reset switch 12. The camera body contains therein a known timer circuit 13 counting time and thus adapted to supply the current time and date. The timer circuit 13 takes the current date as the film loading date to be stored in a memory 14 when the date setting switch 11 is actuated. A calculation circuit 15 calculates the lapse of time from the film loading date, based on the current date as determined by the timer circuit 13 and the film loading date stored in the memory 14. When the film loading duration exceeds a duration preset in a duration setting unit 16, an oscillator circuit 17 starts oscillating. The duration preset in the duration setting unit 16 is deliberately set a little shorter than the effective period of the film, e.g., one year. Since films have a different effective period depending on their type, the duration preset may be changed manually as occasion arises.

Further, the preset duration may automatically be altered by changing the content of the duration setting unit 16 based on film information obtained from the DX contacts which, as described later, can discriminate among the various types of film. The DX contacts may be used as the date setting switch since they can detect the patrone loading.

The oscillator circuit 17 turns on a transistor 18 upon output of an "H" pulse signal therefrom. The oscillator circuit 17 starts generating a pulse signal when a signal indicating that the film loading duration exceeds the preset duration is outputted from the calculation circuit 15, thereby to turn on and off the transistor 18 with a constant frequency. The transistor 18 is coupled to a driver 20 for driving a display 19 which changes its display between a continuous illumination state and a flashing illumination state by controlling the power to the driver 20. The display 19 may be, for example, a liquid crystal display which is mounted on the camera body to display the film loading date stored in the memory 14. The stored film loading date in the memory 14 is erased by actuating the reset switch 12.

Next, the operation of the film loading display device constructed as above will be described. Upon actuation of the date setting switch 11 after loading a patrone in the camera body, the current date as determined by the timer circuit 13 is stored in the memory 14 as a film loading date which is later displayed on the display by continuously illuminated indicia.

When one year elapses from the film loading date, a signal indicating that the film loading duration exceeds the preset duration is outputted from the calculation circuit 15 and is supplied to the oscillator circuit 17 to turn the transistor 18 on and off cyclically. Consequently, the display 19 displays the film loading date by flashing illumination thereby to indicate indirectly that a new film should replace the old one.

In the above embodiment, the film loading date stored in the memory 14 is displayed. However, the film loading duration counted from the film loading date, which is calculated in the calculation circuit 15, may be displayed on the display 19 via the driver 20.

Figure 2:
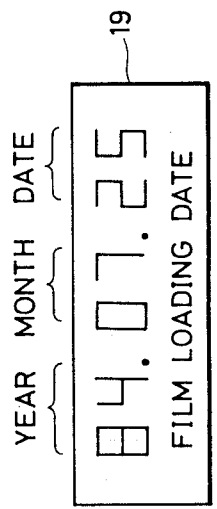
FIG. 2 shows an example of a display of the film loading date.

FIG. 2 shows an example of the form of the display 19, wherein there are provided a year display section, a month display section and a day display section, each of two digits, and a printed legend "Film Loading Date" under the display sections.

FIG. 3 shows another embodiment of the film loading date display device of the present invention applied to a camera that prints the date on the exposed film. As is known in the art, such a date printing camera 1 has at opposite sides of the camera body 26 a patrone chamber and a film winding chamber, and at the front side a taking lens 27, a finder 28 and a stroboscopic flash lamp section 29. The taking lens 27 and the finder 28 are so disposed that they can be covered by a slidable lens cover 30. On the top of the camera body 26, there are provided a display 31 for displaying the film loading date, or the current date or time, a control member 33 for actuating a display switch 32 and displaying the film loading date on a display 31, and a shutter release button 34.

To load the film, a film loading door knob 35 is slid downward to unlock a film loading door 36. DX contacts 39a, 39b, ... 39n are mounted in the patrone chamber for reading a DX code section 38 provided on the outer periphery of the patrone 37. The DX code section 38 is constructed of conductive portions (indicated by hatching) where the metal of the patrone is exposed and non-conductive portions coated with insulating paint, thereby to transmit information about the film 40 such as its speed, the number of frames and so on. These DX contacts 39a to 39(n−1) are connected to a film speed automatic setting device 41 to set automatically the read-out film speed. If a patrone 37 has been loaded in the patrone chamber, any one of the DX contacts 39a to 39(n−1) contacts the conductive portion on the patrone so that the corresponding signal has a value "L". Therefore, in this case, with the DX contacts 39a to 39(n−1) connected to a NAND gate 42, and "H" signal indicating that the patrone has been loaded in the patrone container is supplied to an AND gate 43 and an inverter 44. Instead of the DX contacts, a protruding pin switch may be mounted in the patrone chamber to detect the loading of the patrone.

A film loading door open/close detecting switch 45 turns on when the door 36 is closed, and turns off when it is opened. An output from the film loading door open/close detecting switch 45 is inputted to the AND gate 43 and to a timer 47 via an inverter 46. The lens cover 30 is slidable between the position wherein the taking lens 27 and the finder 28 are covered and the retracted position in which they are uncovered. When the lens cover 30 is moved to the retracted position, a lens cover open/close detecting switch 48 is turned on to input a lens cover open signal to the timer 47.

A timer circuit 50 may use a microcomputer by which a current time and date are counted using the functions of the microcomputer. The timer circuit 50 takes the current date stored in a memory 51 as the film loading date when an "H" signal is outputted from the AND gate 43. A changeover switch 52 selects either the current time or the current date counted by the timer circuit to supply it to a driver 53 and to a driver 55 via a changeover switch 54. Since the time and date are represented by binary codes, the number of output lines from the timer circuit is plural in reality.

An on-signal from the display switch 32 and an output signal from the timer 47 are inputted to an OR gate 57 whose output holds an "H" level during the time the control member 33 is pushed or before the lapse of the time set by the timer 47, e.g., 10 sec. During the time the output of the OR gate 57 holds an "H" level, the changeover switch 54 remains in contact with contact a instead of contact b so that the film loading date stored in the memory is supplied to the driver 55 and an oscillator 58 starts oscillating. As a result, the film loading date is displayed on a display 31 in a flashing illumination state.

The driver 53 on the other hand drives a liquid crystal display 61 disposed near the film 60. The date or time displayed on the liquid crystal display 61 is printed on the film 60 with the aid of a lamp 63 whose illuminating time is controlled by a date print control circuit 62.

The operation of the above embodiment will now be described. After sliding the film loading open/close knob 35 to an unlock position to open the door 36, a patrone 37 is loaded into the patrone chamber. Upon loading of the patrone 37, any one of the DX contacts 39a to 39(n−1) becomes "L" so that the output of the AND gate 42 becomes "H". Closing the door 36 after loading the patrone 37 turns on the film loading door open/close detecting switch 45, so that the output of the AND gate 43 becomes "H" which is then sent to the timer circuit 50 as a film loading date setting signal. In response to this film loading date setting signal, the timer circuit 50 causes the current counting date to be stored in the memory 51.

The film loading date stored in the memory 51 can be presented on the display 31 by depressing the control member 33. In particular, if it is desired to know the film loading duration, the control member 33 mounted on the camera body 26 is depressed to turn on the display switch 32, change the changeover switch 54 to the contact b side, and start oscillation of the oscillator 58. Consequently, the film loading date stored in the memory 51 is sent to the driver 55 to be displayed on the display by flashing illumination. This flashing illumination continues as long as the control member 33 is depressed. Alternatively, if the control member 33 is released from a depressed position, the date counted by the timer circuit 50 is displayed on the display 31 by continuous illumination.

The display of a film loading date continues for a certain period set by the timer 47, not only at the time the control member 33 is actuated, but also at the time the lens cover 30 is opened or at the time the film loading door 36 is opened. Since the lens cover 50 moves to a retracted position prior to photographing, it is possible to confirm the film loading date whenever taking photographs. Furthermore, since the film loading door 36 is opened for removing the patrone 37 from camera body 26, the film loading door open/close switch 48 turns off to actuate the timer 47. Thus, it is possible to indicate the film loading date at the time of removing the patrone 37.

Since the current date or time counted by the timer circuit 50 is displayed on the liquid crystal display 53 via the driver 61, the lamp 63 illuminated in synchronism with the shutter actuation enables printing the date or time displayed on the liquid crystal display 61 onto the film 60.

After exposing all the frames and removing the patrone 37 from the patrone chamber by opening the door 36, the DX contacts 39a to 39(n−1) all become "H" so that the output from the NAND gate 42 becomes "L". The output from the NAND gate 42 is inverted by the inverter 44 and sent to the memory 51 to reset the film loading date stored in the memory 51.

As described in the foregoing description of the present invention, a film loading date is stored in the memory and it is displayed on the display as the occasion arises or at all times. Thus, upon confirming the film loading date on the display, it is possible (although the date is in most cases memorized or recorded in a diary or a calendar in case of an important event such as a wedding) to correctly decide whether the photographs of an event one wishes to look at have been sent for development or whether they are still in the camera. Furthermore, upon confirming the film loading date on the display, one can judge if there is a risk of quality change of the film loaded in the camera. Furthermore, occurrence of a film quality change can be avoided by taking photographs with attention being paid to the film loading date displayed on the display, replacing the film if necessary, and so on.

It will be apparent to those skilled in the art that, in place of a preset duration in the above-described embodiment, a film effective period indicated on the patrone 37 may be set in the duration setting unit 16. This can be effected with the aid of manually operable switches connected to the duration setting unit 16.

Although the present invention has been described by way of preferred embodiments, it is to be understood that various changes and modifications as will be apparent to those skilled in the art can be made without departing from the scope of the present invention.

What is claimed is:

1. A film loading date display device for a camera, comprising
    (a) a timer circuit (50) for counting current date information;
    (b) a memory (51) for storing date information;
    (c) means for transferring current date information from said timer circuit to said memory when film is loaded into the camera, whereby said memory stores the date on which the film is loaded, said transfer means including
        (1) switch means (45) connected with a film loading door for producing a first signal when the film loading door is closed;
        (2) at least one contact (39) in the film receiving chamber of the camera for producing a second signal when film has been loaded in the camera film chanber; and
        (3) logic circuit means (43) connected with said switch means and said contact for activating said timer circuit to transfer current date information to said memory in response to said first and second signals; and
    (d) means (31) for displaying said film loading date.

2. Apparatus as defined in claim 1, wherein said display means normally displays the current date information from said timer circuit, and further comprising a display switch connected with said display means for switching said display means to display said film loading date.

3. Apparatus as defined in claim 2, wherein said display means includes oscillator means for displaying said film loading date with flashing illumination.

* * * * *